(12) United States Patent
Eilertsen

(10) Patent No.: US 6,708,765 B1
(45) Date of Patent: Mar. 23, 2004

(54) METHOD AND DEVICE FOR RISER TENSIONING

(76) Inventor: Bjørn Eilertsen, Hundvåg Ring 11, N-4085 Hundvåg (NO)

( * ) Notice: Subject to any disclaimer, the term of this patent is extended or adjusted under 35 U.S.C. 154(b) by 0 days.

(21) Appl. No.: 09/787,055

(22) PCT Filed: Sep. 22, 1999

(86) PCT No.: PCT/NO99/00296

§ 371 (c)(1), (2), (4) Date: Jul. 3, 2001

(87) PCT Pub. No.: WO00/22277

PCT Pub. Date: Apr. 20, 2000

(30) Foreign Application Priority Data

Sep. 25, 1998 (NO) ................................................. 984474

(51) Int. Cl.$^7$ ................................................. G21B 29/12
(52) U.S. Cl. ................. 166/350; 166/355; 166/359; 405/224.4
(58) Field of Search ............. 166/355, 353, 166/359, 350; 405/224, 224.4

(56) References Cited

U.S. PATENT DOCUMENTS

| | | | |
|---|---|---|---|
| 1,916,466 A | | 7/1933 | Eckles |
| 3,540,396 A | * | 11/1970 | Horton |
| 4,142,584 A | * | 3/1979 | Brewer et al. |
| 4,198,179 A | * | 4/1980 | Pease et al. |
| 4,395,160 A | | 7/1983 | deJong |
| 4,604,001 A | * | 8/1986 | Wetmore |
| 4,646,841 A | * | 3/1987 | Schawann et al. .......... 166/355 |
| 4,762,185 A | * | 8/1988 | Simpson |
| 5,363,920 A | * | 11/1994 | Alexander et al. |
| 5,846,028 A | * | 12/1998 | Thory ........................ 166/350 |
| 6,045,296 A | * | 4/2000 | Otten et al. |
| 6,161,620 A | * | 12/2000 | Cox et al. .................... 166/367 |
| 6,336,622 B1 | * | 1/2002 | Eilersen et al. ............... 254/95 |
| 6,352,116 B1 | * | 3/2002 | Borseth ....................... 166/359 |

FOREIGN PATENT DOCUMENTS

| | | |
|---|---|---|
| NO | 157074 B | 10/1987 |
| NO | 159813 B | 10/1988 |
| WO | WO 85/01775 | 4/1985 |
| WO | WO 9848142 A1 | 10/1998 |

* cited by examiner

Primary Examiner—Thomas B. Will
Assistant Examiner—Thomas A. Beach
(74) Attorney, Agent, or Firm—Cowan, Liebowitz & Latman, P.C.; Mark Montague

(57) ABSTRACT

To maintain a riser under tension, the riser can be connected to a gripper (5, 12) which is connected to vertical toothed racks (4) that are in constant engagement with gear wheels (22) which are driven with constant torque, preferably by hydraulic motors (9) at constant pressure. An apparatus is also described for putting the riser under tension. The apparatus includes vertical guides (7) in a derrick, toothed racks (4) in the vertical guides (7), a gripper (5, 12) designed for interaction with a riser connected to the racks (4), and drive units (9) arranged in the derrick for drive-actuation of the racks (4) in the vertical guides (7).

11 Claims, 7 Drawing Sheets

Fig. 13
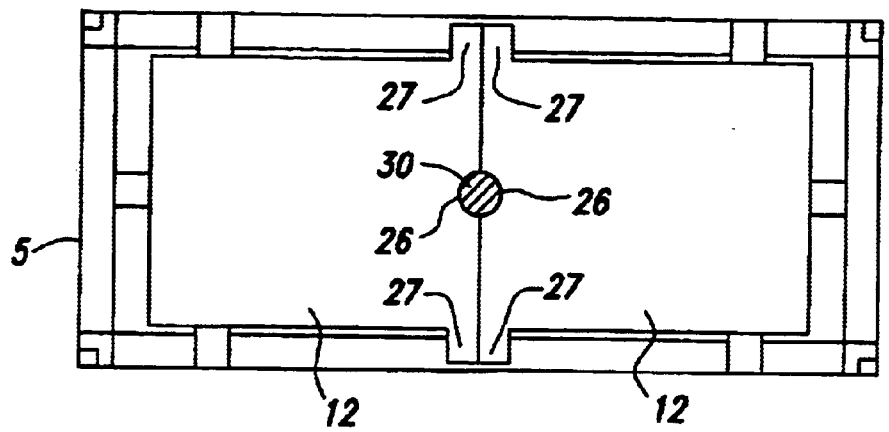
Fig. 14
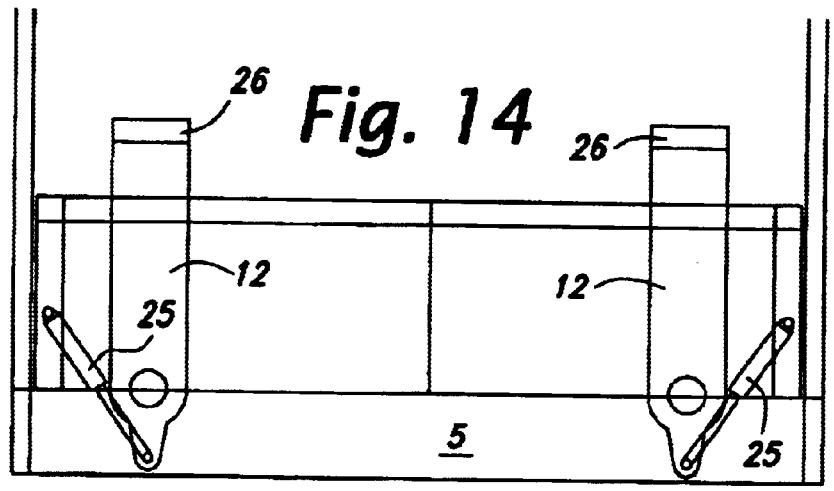
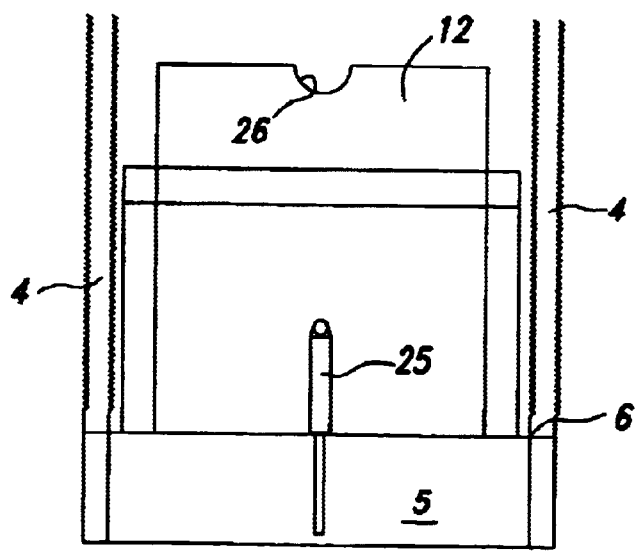
Fig. 15

METHOD AND DEVICE FOR RISER TENSIONING

BACKGROUND OF THE INVENTION

The present invention relates to apparatuses for putting risers under tension, heave-compensating rig floors and for guiding equipment through a moonpool.

BRIEF DESCRIPTION OF THE DRAWINGS

The invention will now be explained in more detail with reference to the attached figures, wherein:

Figure 1:
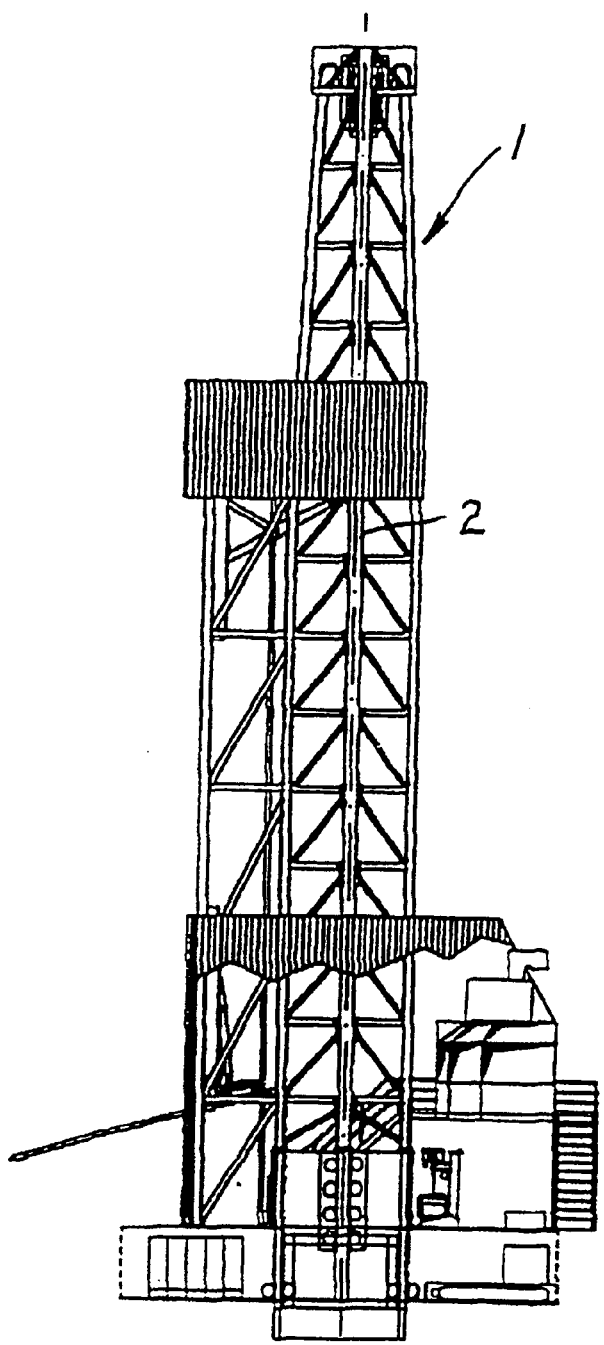
Figure 2:
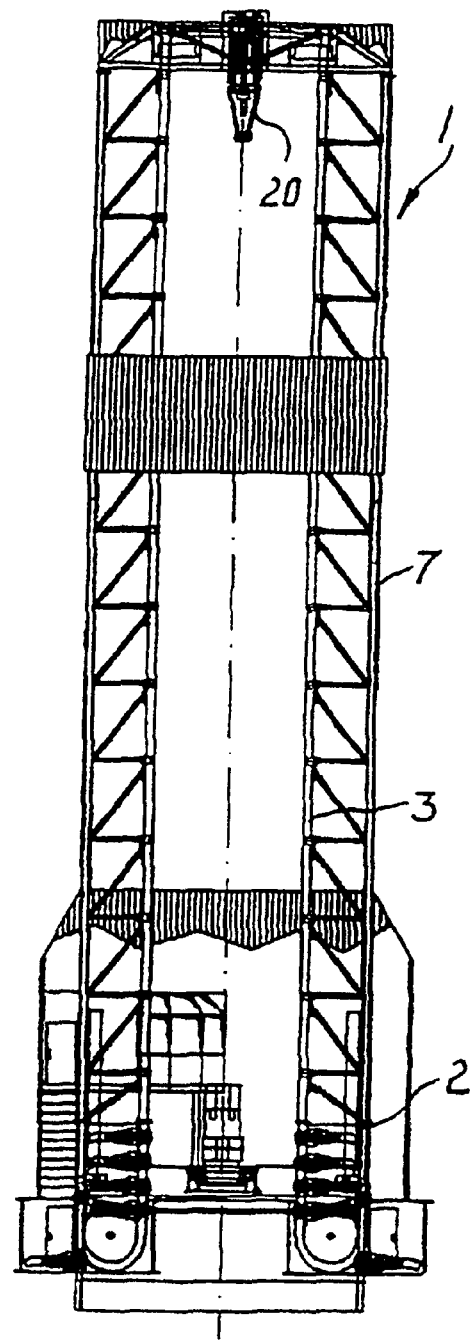
Figures 3, 4:
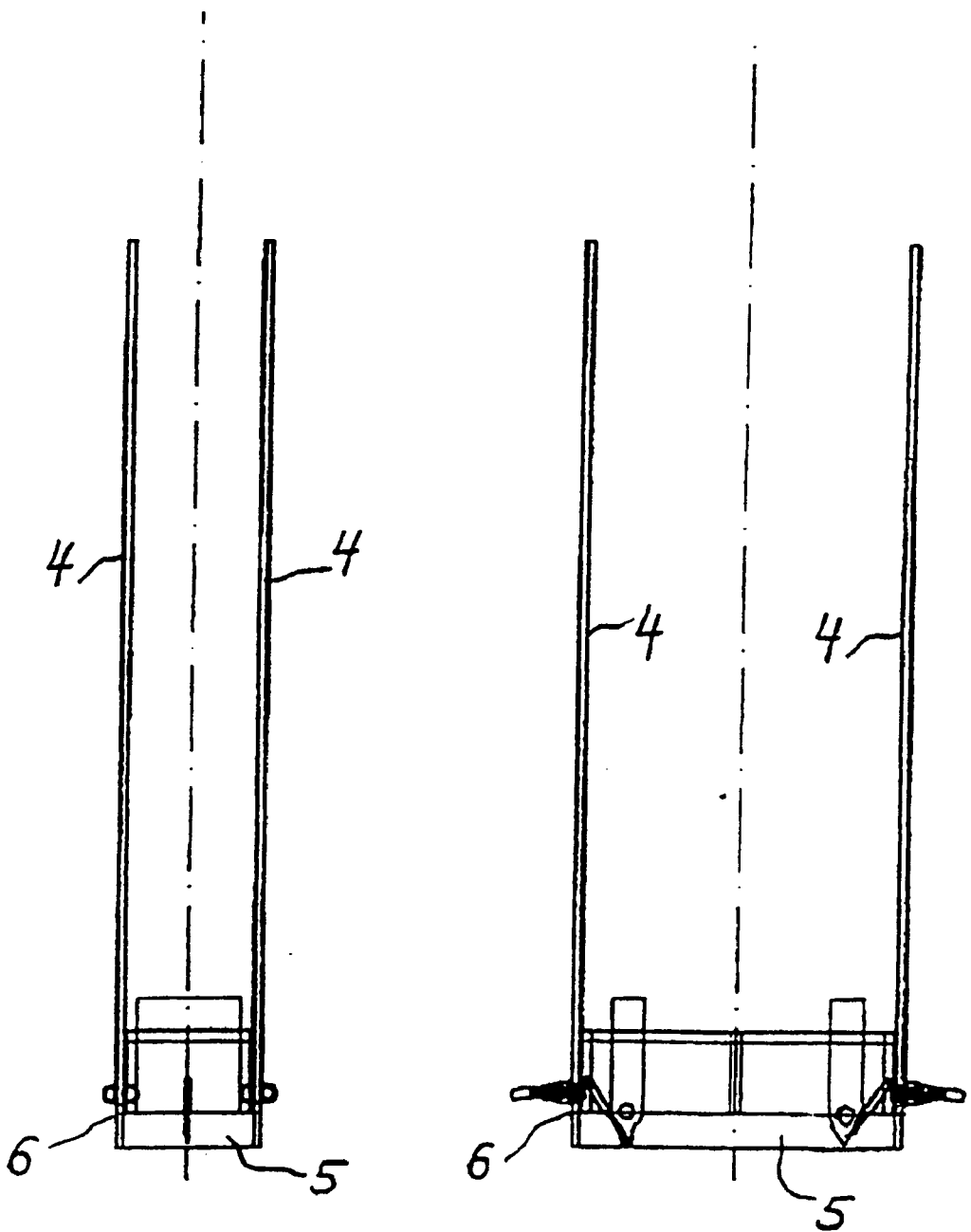
Figures 5, 6:
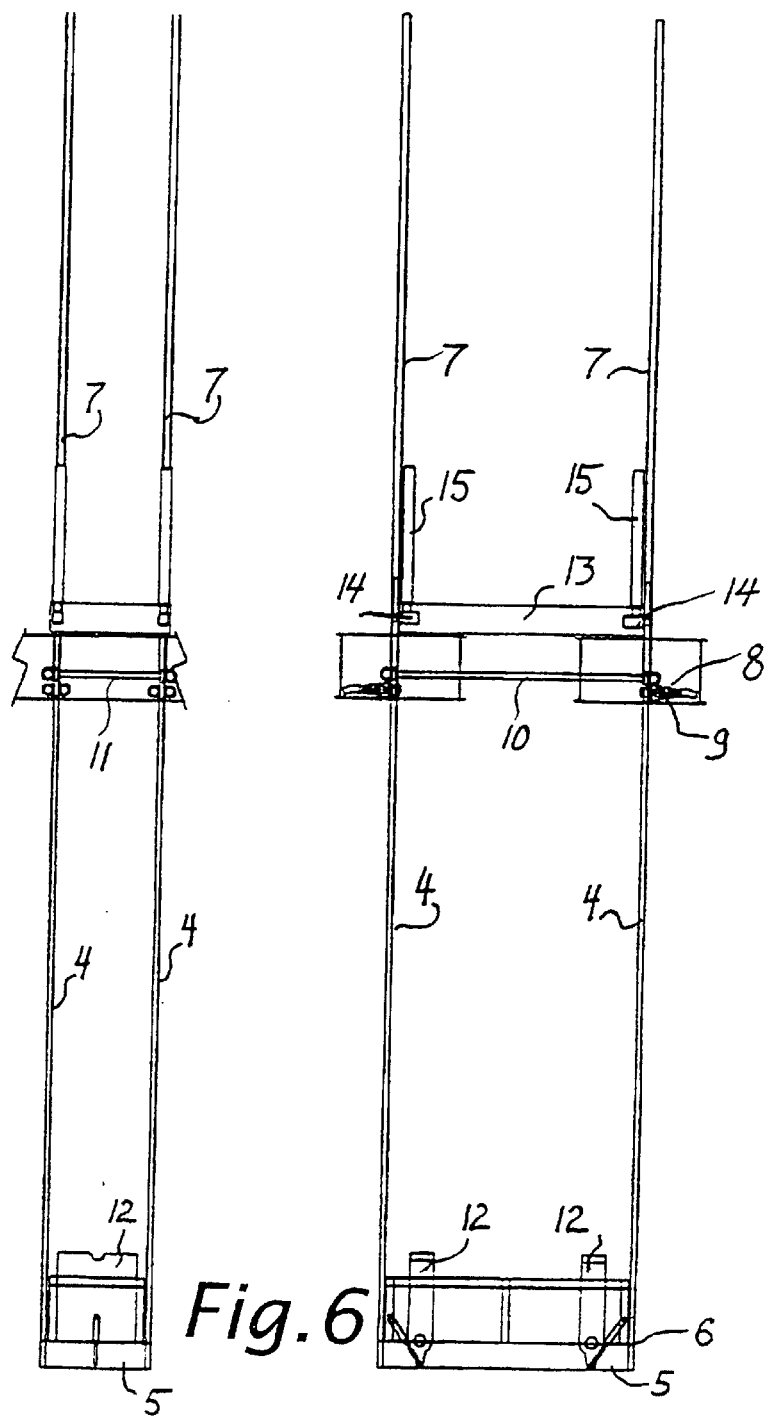
Figure 7:
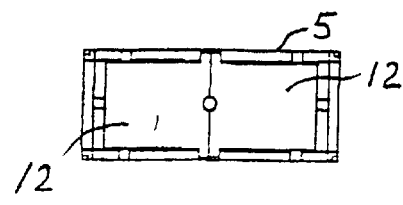
Figure 8:
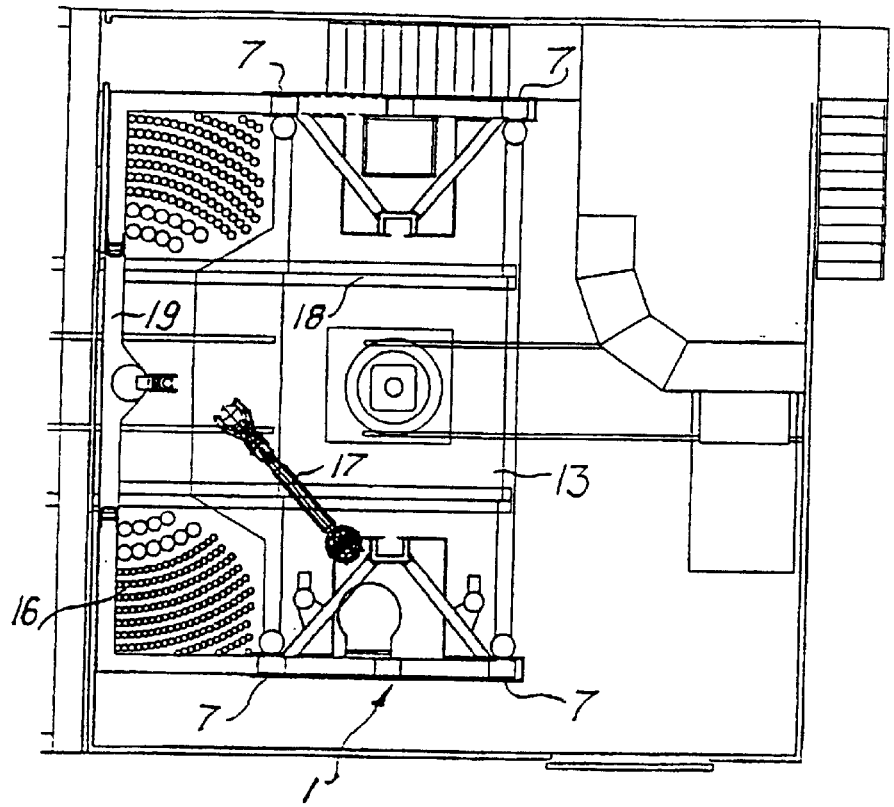
Figure 9:
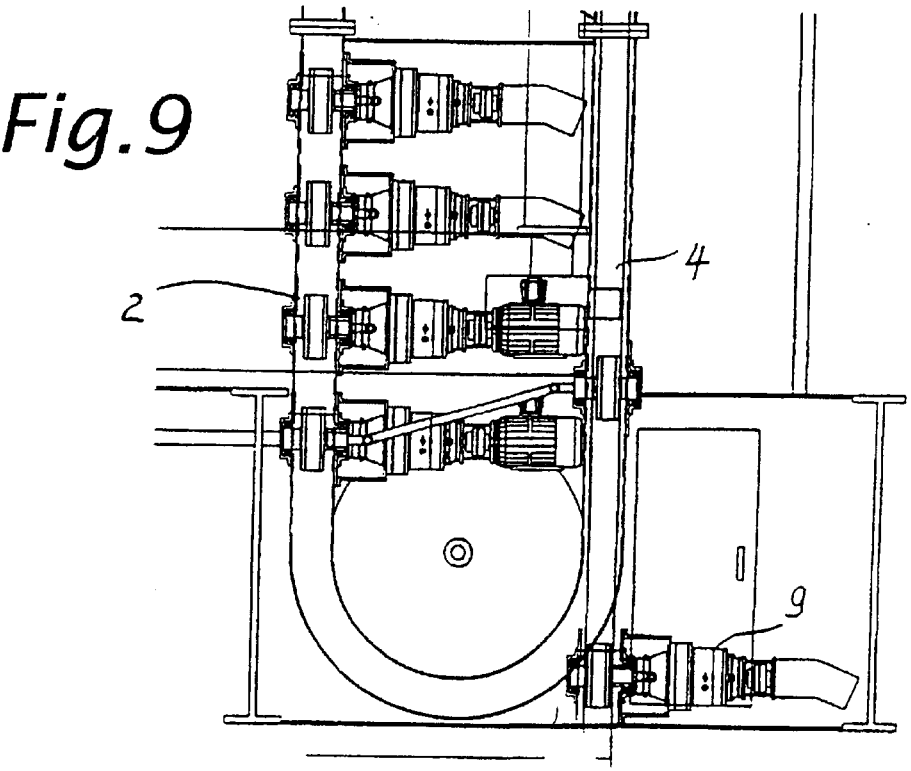
Figure 10:
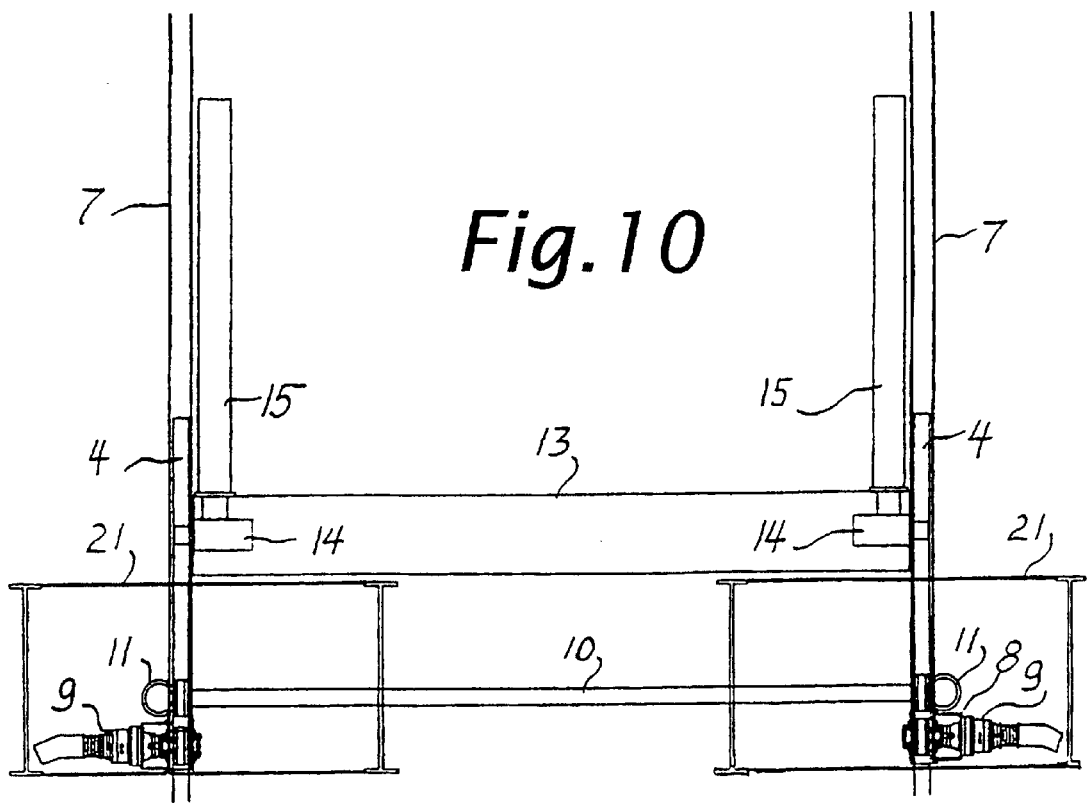
Figure 11:
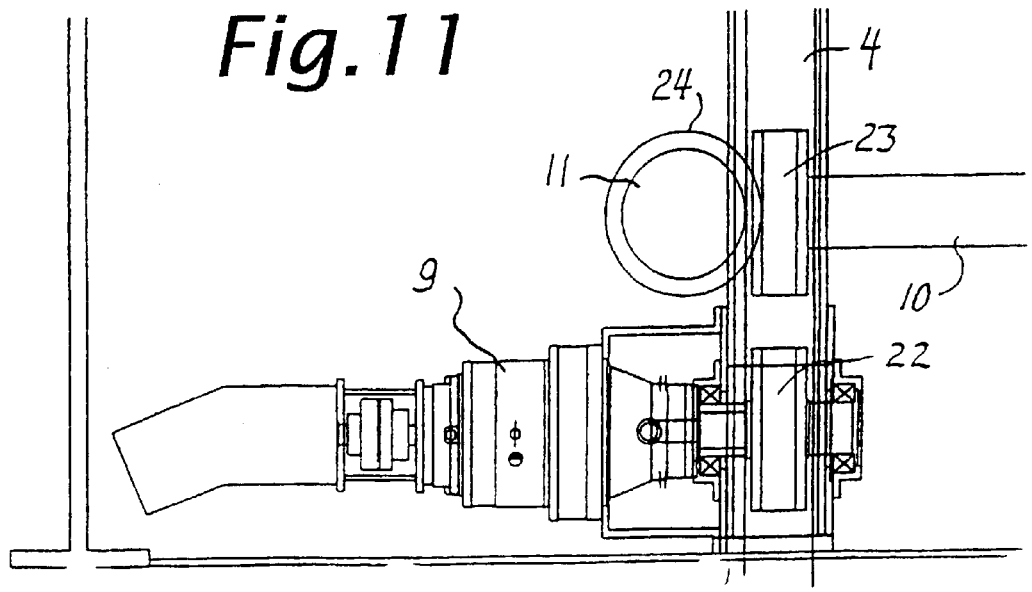
Figure 12:
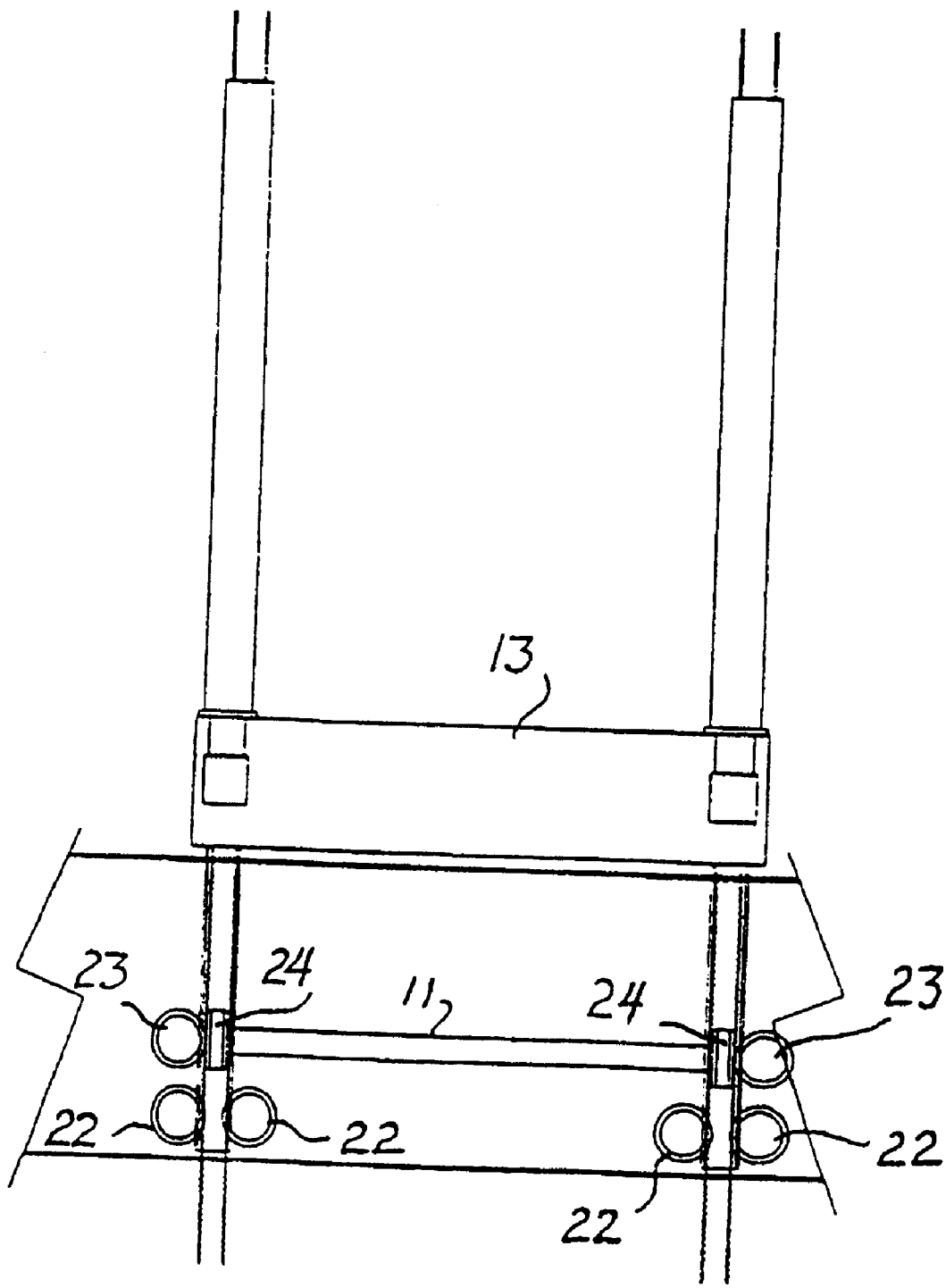

| | |
|---|---|
| FIG. 1 | is a side view of a derrick; |
| FIG. 2 | is a front view of a derrick; |
| FIG. 3 | is a side view of an apparatus according to the invention; |
| FIG. 4 | is a front view of an apparatus according to the invention; |
| FIG. 5 | is a more detailed side view of an apparatus according to the invention; |
| FIG. 6 | is a more detailed front view of an apparatus according to the invention; |
| FIG. 7 | is a top view of an apparatus according to the invention; |
| FIG. 8 | is a top view of a derrick looking towards the rig floor; |
| FIG. 9 | shows a detail of the drive gear of the derrick and the apparatus according to the invention; |
| FIG. 10 | is a sectional view of the apparatus according to the invention with drive gear and heave-compensated rig floor; |
| FIG. 11 | shows a detail of the drive gear of the apparatus according to the invention; |
| FIG. 12 | is a sectional side view of the apparatus according to the invention with drive gear and heave-compensated rig floor; |
| FIG. 13 | is a top view of a riser gripper platform according to the present invention; |
| FIG. 14 | is a front view of the riser gripper platform; |
| FIG. 15 | is a side view of the riser gripper platform. |

DESCRIPTION OF THE PREFERRED EMBODIMENTS

FIG. 1 shows a derrick 1 comprising a drive mechanism for a top drive rotary machine as described in PCT/NO/98/00/30. This drive mechanism will not be explained in more detail here; instead reference is made to the aforementioned document in which there is a comprehensive explanation thereof. FIG. 2 is a side view of the derrick 1, and here the drive mechanism 2 with toothed rack 3 is seen more clearly. FIG. 3 is a side view of the apparatus according to the invention, whilst FIG. 4 is a front view of the same apparatus. The apparatus comprises preferably four, but at least two, toothed racks 4, which are arranged substantially parallel to one another. The racks are connected to a gripper platform 5, preferably via a relatively flexible articulation 6.

FIGS. 5–7 show the apparatus according to the invention in more detail. The toothed racks are arranged to be passed down into a cavity in a part of the derrick structure. In the illustrated case each rack is accommodated in a respective hollow leg 7, which constitutes a part of the lattice work of the derrick. A drive gear 8, which in the illustrated case comprises eight hydraulic motors 9, arranged in pairs on each side of each rack 4, is adapted to move the racks 4 in and out of the legs 7. To obtain synchronisation of the eight hydraulic motors 9, these may optionally be connected to each other via shafts 10 and 11. Of course, the synchronisation of the eight motors can also be achieved by other means, e.g., hydraulically or electronically.

The four toothed racks 4 are connected to the gripper platform 5 via an articulation or flexible connection 6. The articulation or flexible connection 6 is capable of neutralising forces that arise due to any minor imprecision in the parallel movement of the racks 4 in and out of the legs 7. The gripper platform 5 comprises two flaps 12, which are adapted to grip below a collar on a non-illustrated riser.

The drive gear 8 is preferably located beneath the rig floor 13. The rig floor 13 itself may optionally also be physically connected to the racks 4, e.g., by means of hydraulic keys 14. In this way, the rig floor 13 is able to follow the movement of the gripper platform 5, and can thus be automatically heave-compensated. In order to adjust the height of the rig floor, the rig floor may be provided with hydraulic cylinders 15, thereby eliminating the need to disconnect the hydraulic locks 14 from and reconnect them to the racks 4 when making minor height adjustments of the rig floor 13.

FIG. 8 is a top view of the rig floor 13, and also shows a section through the derrick structure 1. This figure also indicates the legs 7, into which the racks 4 are passed. When the racks 4 have been passed into the legs 7, the racks 4 will not be visible above the rig floor, and nor will they represent any danger to personnel or take up space. FIG. 8 also shows a pipe rack 16 and a pipe handling means 17. On the rig floor 13 there are also provided rails 18 for a dolly 19, which is designed to carry equipment into position above the moonpool.

FIG. 9 is a sectional view of the drive gear 2 for the rotary machine 20 (FIG. 2). This figure also shows a hydraulic motor 9 for actuating the rack 4.

FIG. 10 is a more detailed sectional view of the drive gear 8 for the racks 4, and shows two of the machinery rooms 21 in which the hydraulic motors 9 are arranged. The figure also shows the shaft 10 and the end of the shafts 11, which connect the hydraulic motors in each machinery room 21 to one another to allow them to be run synchronously. Also shown in this figure is the rig floor 13, which is equipped with four hydraulic locks 14 and four hydraulic height-adjusting cylinders 15.

FIG. 11 shows a hydraulic motor 9, which via a gear wheel 22 is in toothed engagement with a toothed portion (not shown) of the rack 4. As can be seen, the shafts 10 and 11 are equipped with gear wheels 23 and 24 at their ends, which gear wheels are in engagement with toothed portions (not shown) of the racks 4. In the illustrated case the shafts 10 and 11 are not in direct operative connection with the hydraulic motor 9, but are in engagement with the racks 4. However, a direct operative connection between the hydraulic motors 9 is also conceivable.

FIG. 12 is a sectional side view of the apparatus according to the present invention, in which the gear wheels 22 on the hydraulic motors 9 can be seen, as can a shaft 11 and the gear wheels 23 and 24. The rig floor 13 is also indicated.

FIG. 13 is a top view of the gripper platform 5, whereas FIG. 14 is a front view of the gripper platform 5, and FIG. 15 a side view of the gripper platform 5. The gripper flaps 12 are equipped with a respective hydraulic cylinder 25, which is adapted to swing the gripper flaps 12 between a horizontal and a vertical position. In the vertical position, the gripper flaps allow the riser and other equipment clear passage between them. In the horizontal position, the gripper flaps 12 engage with a riser 30, which comes to rest in the recesses 26 in the gripper flaps 12 (FIG. 13). The recesses 26 together form a substantially circular hole, which has a smaller diameter than a collar on the riser, which collar comes to rest on the top of the gripper flaps. The gripper flaps 12 are also equipped with stops 27, which come to bear against the gripper platform 5, so that load taken up by the cylinders 25 is not particularly large.

In addition to functioning as a tension device for a riser and as a heave compensator for the rig floor, the apparatus according to the invention is also capable of functioning as a hoist for equipment that is to be passed through the moonpool on a drill and production ship. For this function, the gripper platform 5 may be equipped with a roller or the like, which can be brought into contact with the moonpool walls, to prevent any risk of the gripper platform striking against the moonpool walls, and causing damage. In this way, e.g., a BOP can be moved safely and securely through the moonpool, it being secured by the gripper platform throughout the lowering operation and until it is clear of the bottom of the ship.

The hydraulic motors 9 are of a conventional type and equipped with a gear box. By operating these at constant pressure when the riser is to be held under tension, and connecting the pressure via an accumulator, constant tension in the riser may easily be obtained. Owing to the constant tension, the racks 4 will always follow the wave lo motion, and a derrick that is connected to the racks will therefore also follow the wave motion. In particular when lowering coiled tubing, this will be advantageous, as the coil can be placed on the rig floor, and the coiled tubing will not be subjected to large loads whilst being lowered.

The toothed racks are preferably designed to be rigid, but for certain purposes they may conceivably be constructed so as to be hinged.

Motions have shown that the racks under tension will withstand loads of as much as 300 tonnes without any difficulty.

What is claimed is:

1. An apparatus for putting risers under tension, characterized in that it comprises vertical guides (7) in a derrick;
toothed racks (4) in the vertical guides (7);
a gripper means (5, 12) designed for selectable interaction with a riser, connected (6) to the racks (4), and drive units (9) arranged in the derrick for drive-actuation of the racks (4) in the vertical guides (7), the gripper means maintaining the riser under tension when the gripper means interacts with the riser.

2. An apparatus according to claim 1, characterised in that the gripper means includes a platform (5) having gripper members (12) for interaction with the riser.

3. An apparatus for putting risers under tension, characterized in that it comprises vertical guides (7) in a derrick; toothed racks (4) in the vertical guides (7);
a gripper means (5, 12) designed for interaction with a riser, connected (6) to the racks (4), and drive units (9) arranged in the derrick for drive-actuation of the racks (4) in the vertical guides (7);
wherein the gripper means includes a platform (5) having gripper members (12) for interaction with the riser;
the gripper members being in the form of flaps (12) supported in the platform so as to be capable of being swung towards one another, each flap having a recess (26) adapted to the half circumference of the riser.

4. An apparatus according to claim 1, characterized in that the drive units (9) include hydraulic drive motors.

5. An apparatus according to claim 2, characterized in that a rig floor (13) is capable of being connected to the racks (4).

6. An apparatus according to claim 1, characterized in that the rig floor is connected to the toothed racks (4) by means of hydraulically actuated keys (14).

7. An apparatus according to claim 6, characterised in that the rig floor (13) is connected to the hydraulically actuated keys (14) by means of hydraulic working cylinders (15) so that the drilling floor can be height-adjusted relative to the keys.

8. An apparatus for putting risers under tension, comprising:
vertical guides in a derrick;
toothed racks in the vertical guides;
a gripper connected to the racks and adapted to selectably interact with a riser, the gripper maintaining the riser under tension when selectably interacting with the riser and for not maintaining the riser under tension when not selectably interacting with the riser; and
drive units arranged in the derrick for drive-actuation of the racks in the vertical guides.

9. The apparatus according to claim 8, wherein the gripper includes a plurality of flaps adapted to swing toward each other.

10. The apparatus according to claim 9, wherein each of the flaps includes a recess adapted to a half circumference of the riser.

11. The apparatus according to claim 8, wherein the gripper includes first and second flaps, each of the flaps adapted to move between horizontal and vertical positions, the gripper maintaining the riser under tension when each of the first and second flaps is in the horizontal position.

* * * * *